May 10, 1949.  J. W. HORNING  2,469,391
QUICK RELEASE DEVICE FOR PARACHUTE HARNESS
Filed July 9, 1946  4 Sheets-Sheet 1
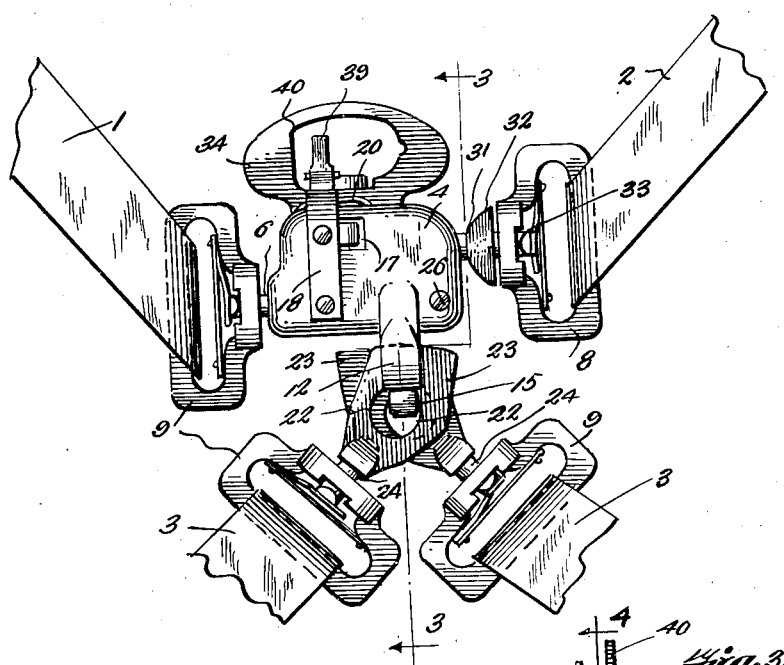
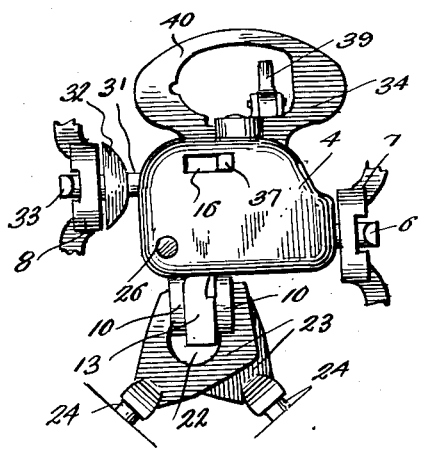
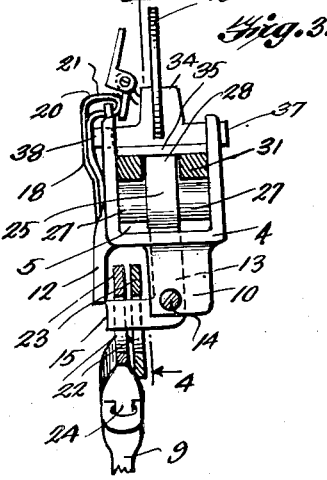
INVENTOR.
JAMES W. HORNING
BY May 10, 1949.　　　　J. W. HORNING　　　　2,469,391
QUICK RELEASE DEVICE FOR PARACHUTE HARNESS
Filed July 9, 1946　　　　　　　　　　　　4 Sheets-Sheet 2
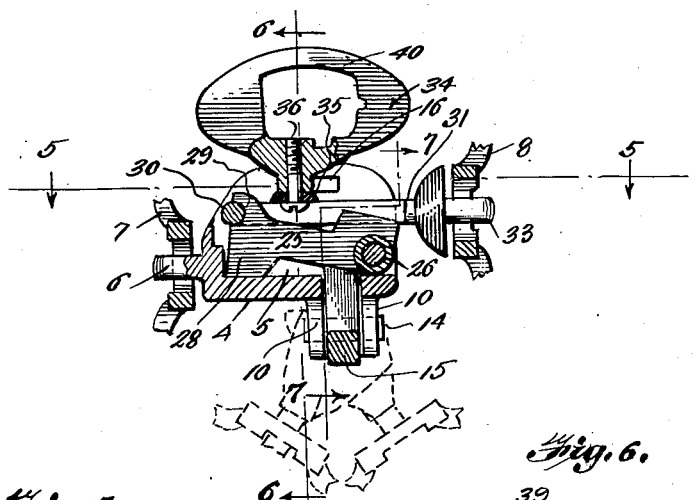
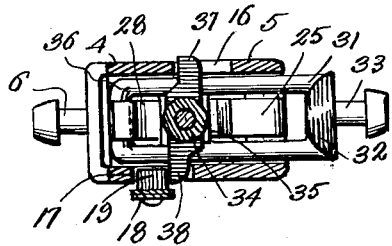
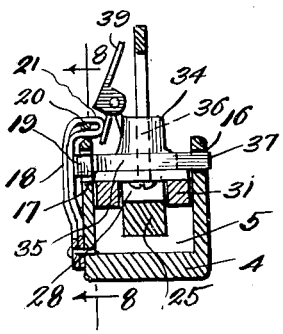
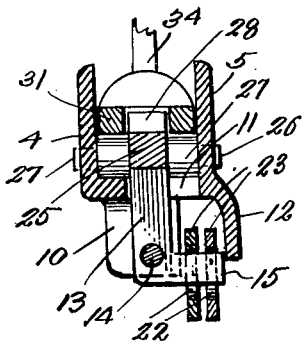
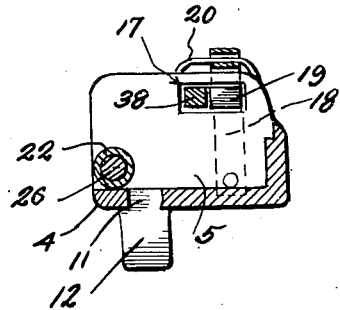
INVENTOR.
JAMES W. HORNING
BY May 10, 1949. J. W. HORNING 2,469,391
QUICK RELEASE DEVICE FOR PARACHUTE HARNESS
Filed July 9, 1946 4 Sheets-Sheet 3
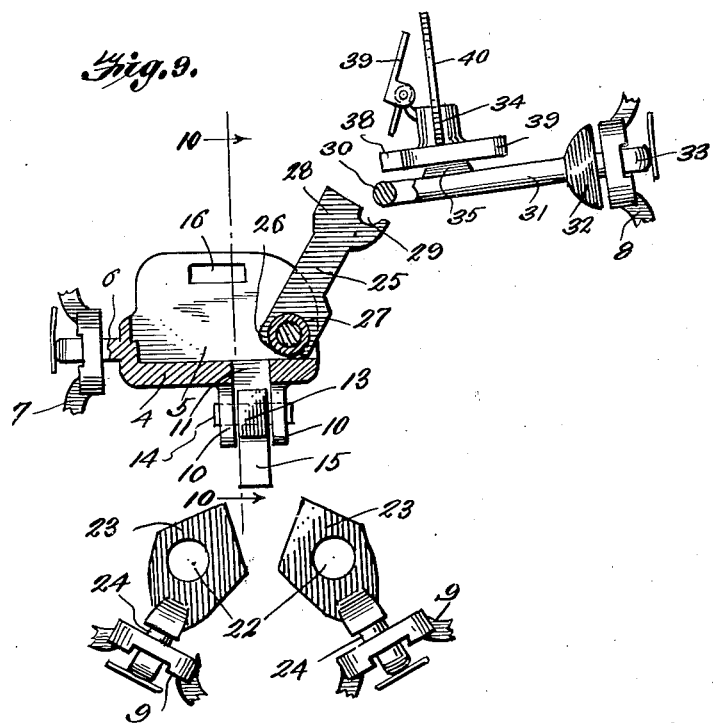
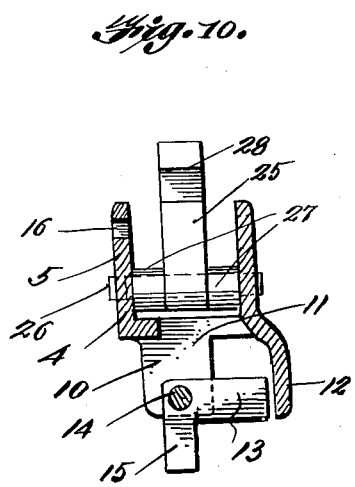
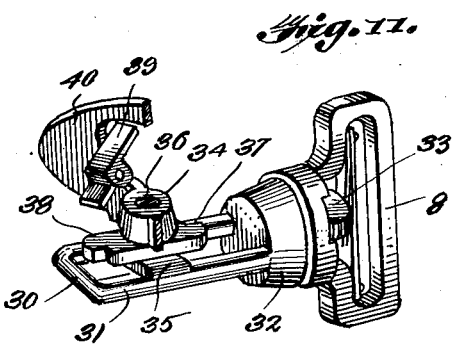
INVENTOR.
JAMES W. HORNING
BY

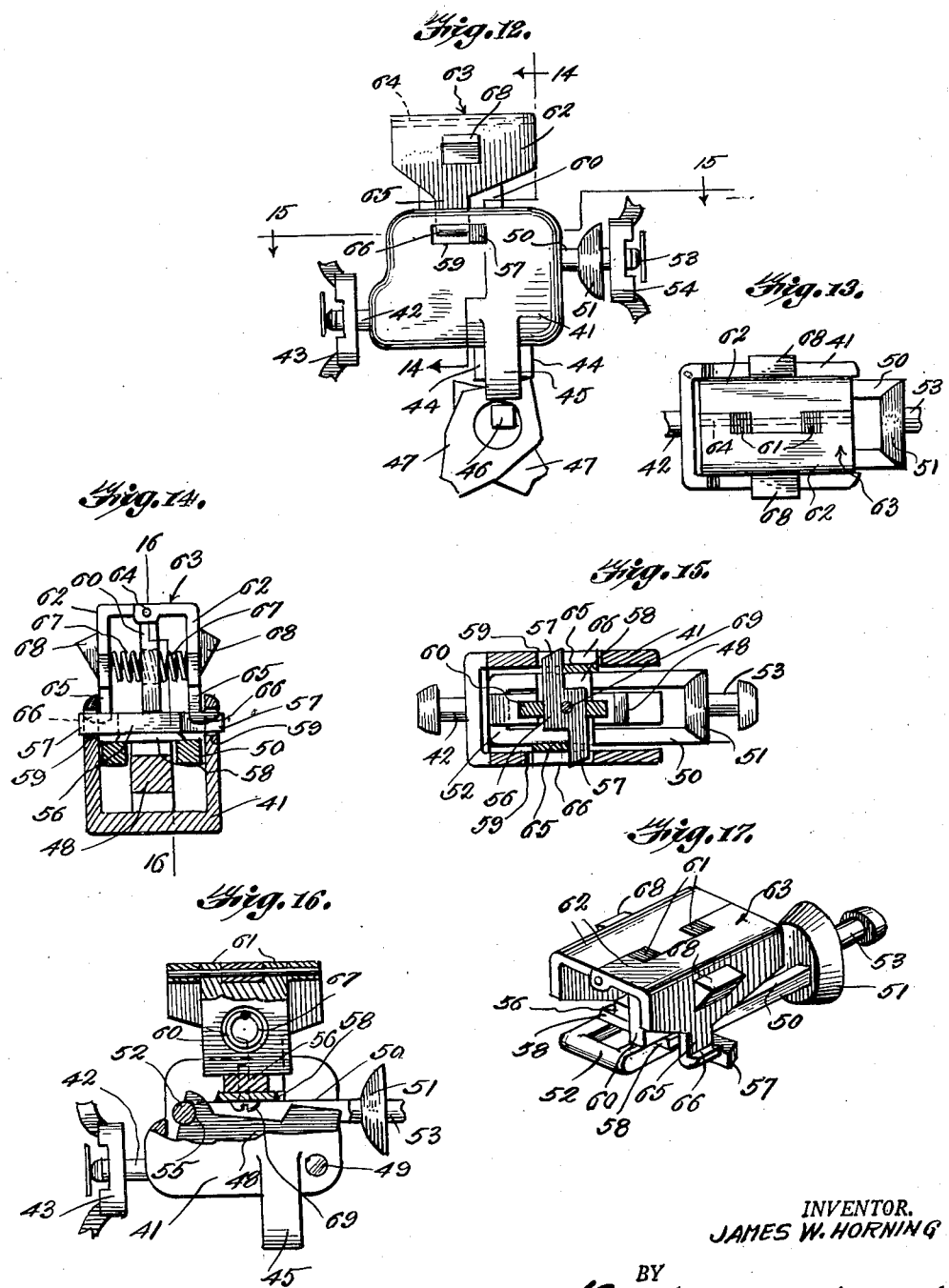

Patented May 10, 1949

2,469,391

UNITED STATES PATENT OFFICE 2,469,391

QUICK RELEASE DEVICE FOR PARACHUTE HARNESSES

James W. Horning, Bloomsburg, Pa.

Application July 9, 1946, Serial No. 682,243

12 Claims. (Cl. 24—205.17)

1

This invention relates to a parachute harness and more particularly to a quick release mechanism, it being one object of the invention to provide a release mechanism so constructed that a person using a parachute and making a descent may very quickly release the harness when necessary and thus be prevented from being dragged along rough ground when he sees that he is going to land in an unfavorable spot.

Another object of the invention is to provide a release mechanism so constructed that while the straps of the harness will be securely held about him and prevented from accidentally slipping loose they may be very quickly released when necessary for safety.

Another object of the invention is to provide a release which may be operated with one hand by grasping and turning a keeper which constitutes an element of the release device.

Another object of the invention is to provide a release mechanism wherein the keeper is normally held against turning movement to a releasing position by a latch so located that when the handle of the keeper is grasped for turning it a latch which secures the keeper will be engaged by the hand grasping the handle and the latch moved to a position out of securing engagement with the keeper.

Another object of the invention is to provide a quick-release mechanism for a parachute harness which is simple in construction, easy to operate, and not liable to be broken when subjected to rough treatment.

The invention is illustrated in the accompanying drawings wherein:

Fig. 1 is a front view of the improved release mechanism.

Fig. 2 is a view looking at the rear face of the release mechanism.

Fig. 3 is a view taken along the line 3—3 of Figure 1.

Fig. 4 is a sectional view taken along the line 4—4 of Figure 3.

Fig. 5 is a sectional view taken horizontally along line 5—5 of Figure 4.

Fig. 6 is a sectional view taken along line 6—6 of Figure 4.

Fig. 7 is a sectional view taken along line 7—7 of Figure 4.

Fig. 8 is a sectional view taken along line 8—8 of Figure 6.

Fig. 9 is a sectional view showing the quick release device in its releasing condition.

Fig. 10 is a sectional view taken along the line 10—10 of Figure 9.

2

Fig. 11 is a perspective view of a strap engaging member and the keeper carried thereby.

Fig. 12 is a front view of a quick release device of modified construction.

Fig. 13 is a top plan view of the same.

Fig. 14 is a sectional view taken vertically along the line 14—14 of Figure 12.

Fig. 15 is a horizontal sectional view taken along the line 15—15 of Figure 12.

Fig. 16 is a view showing the quick release device partially in elevation and partially in section along the line 16—16 of Figure 14.

Fig. 17 is a perspective view of the upper releasable member.

This improved quick release device is used in connection with partchute harnesses of conventional construction having the usual shoulder straps 1 and 2 and leg straps 3, portions of which are shown in Figure 1. The block or body 4 of the release device is formed of strong metal, or other suitable material, and is formed with a pocket 5 which is open along its top and at one end, the other end of the pocket being closed and carrying a stud 6 with which the shackle 7 carried by the strap 1 is detachably connected. A similar shackle 8 is carried by strap 2 and the straps 3 also carry shackles 9. These shackles are all of the same construction, and now in use upon parachute harnesses, and when these are grasped and turned they may be detached from the studs with which they are normally engaged and a person who has made a successful descent release himself from the parachute. Ears 10 extend downwardly from the bottom of the block at opposite sides of an opening 11 and from the inner side of the block extends a tongue 12 serving as a guard for a hook 13 which is pivotally mounted between the ears by a pin 14 and is formed with a laterally extending bill 15. Openings 16 and 17 are formed through walls of the pocket 5 and against the outer surface of the block is mounted a vertically extending latch 18 formed from a folded strip of resilient metal and carrying a tooth 19 which has movement through the opening 17 into and out of a latching position. The upper end portion of the latch is bent rearwardly over the upper edge of the front wall of the pocket and loosely engaged about a guide 20 mounted along the upper edge of the front wall. The bent upper end portion of the latch serves as a bill for the latch and when pressure is applied to the end of this bill 21 the latch will be sprung or flexed forwardly of the block and the tooth 19 will be moved outwardly through the opening 17 to a releasing position. The bill 15 of the hook 13 is of sufficient length to pass through openings 22 formed in plates 23 carrying stems or studs 24 with which the shackles 9 are detachably engaged and when the hook is in the supporting position shown in Figures 3 and 7 the plates will be held upon its bill or arm 15 since the end of the bill is close to the lower end of the tongue 12. When the hook is in this supporting position the upper end of its shank extends upwardly through opening 11 into the pocket 5 and downward tilting movement of the hook to a releasing position will be prevented by a retainer 25 consisting of a metal bar which is pivoted at one end upon a pin 26 and held against sliding movement along the pin by spacer sleeves 27.

The retainer is of such length that it may be housed in the pocket with its pivoted end portion extending across the upper end of the shank of hook 13 and the head 28 at its free end resting upon the bottom of pocket 5. The head 28 projects above and below the retainer and its upper portion is formed with a transversely extending groove 29 to receive the cross bar 30 of a U-shaped yoke 31. This yoke 31 extends longitudinally in the pocket, as shown in Figure 5, with its side arms at opposite sides of the retainer 25 and at its outer end the yoke is provided with a head 32 from which extends a stem or stud 33 for engagement by the shackle 8. In view of the fact that the cross bar 30 of the yoke is engaged in the notch 29 of the retainer 25 it will be impossible for the bar to swing upwardly to a raised position and allow the hook 13 to swing downwardly and release the plates 23 as long as the yoke is held in the position shown in Figures 4 and 5. In order to releasably secure the yoke in the securing position there has been provided a keeper 34 which is pivotally connected with a bridging strip 35 carried by the yoke 31 by a pin 36. This keeper is formed with side arms 37 and 38 and when the keeper is turned to the securing position the side arms engage through the openings 16 and 17 and as the arm 38 moves into the opening 17 its end passes across the tooth 19 of the latch 18 and the latch will then return to its normal position and its tooth serve to prevent accidental turning of the keeper to a releasing position. A small lever 39 is pivotally mounted in a vertical position upon the keeper at a side thereof which confronts the latch when the keeper is in its securing position and when the handle 40 of the keeper is grasped in order to turn the keeper to a releasing position the thumb of the hand grasping the handle will press against the upper end portion of the lever and tilt the lever about its pivot. The lower end of the lever will then be brought into engagement with the bill 21 of the latch and the latch will be forced outwardly to a releasing position in which its tooth moves away from the arm 38 and the keeper may be turned out of the securing position. As the arms 37 and 38 move out of the openings 16 and 17 the keeper will be freed from the block and the weight of the shackle 33 will cause the yoke and the retainer 25 to be tilted. The yoke 31 comes free from the retainer 25 as the bar approaches the raised position shown in Figure 9 and frees the strap 2. As soon as the retainer 25 moves upwardly out of engagement with the upper end of the hook 13 the weight of the bill or arm 15 and also pull of the leg straps 3 will tilt the hook about the pin 14 and as the bill 15 swings downwardly the plates 23 will slip out of engagement with the hook and the leg straps will be freed. It will thus be seen that the person using the parachute may very easily and very quickly release himself from the harness and land without being injured by being dragged along rough ground. This also eliminates danger of drowning if a landing is made over water. When a safe landing is being made the quick release is not made use of as the shackles 7, 9, and 8 will be turned and released from the studs, 6, 24 and 33 in the usual manner.

In Figures 12 through 17 there has been illustrated a quick release device of modified construction. In this embodiment of the invention the block 41, which corresponds to the block 4 is open along its top and at one end and at its other end carries a headed stem 42 for detachable engagement by the shackle 43 corresponding to the shackle 7. Ears 44 and a tongue 45 extend downwardly from the body and between the ears is pivotally mounted a hook 46 which corresponds to the hook 13 and has the outer end of its bill disposed close to the tongue after the hook has been passed through the anchoring plates 47 which correspond to the plates 23. When the hook is passed through the plates 47 and turned to an operative position its shank projects upwardly through an opening in the bottom of the body for engagement by the retainer 48, which corresponds to the retainer 25 and holds the hook in the operative position when it is disposed horizontally in the block or body 41 with the lower edge face of its pivoted end portion resting upon the upper end of the shank of the hook. A pin 49 pivotally mounts the retainer for swinging movement from the lowered operative position to an upwardly disposed extended position in which the hook will be released and allowed to swing downwardly to release the plates 47. The yoke 50 corresponding to the yoke 31 is U-shaped and has its side arms extending from a head 51 and connected by a cross bar 52, the head 51 being provided with a stem 53 for engagement by the shackle 54 corresponding to the shackle 8. When the yoke 50 is engaged with the keeper 48 it straddles the keeper and has its cross bar or bridge 52 seated in the notch 55 formed at the free end of the retainer and its side arms disposed at opposite sides of the retainer, and it will be seen that when the retainer is released pull exerted by the yoke will swing the retainer upwardly and rearwardly to an extended position allowing detachment of the yoke from the retainer substantially simultaneously with release of the plates 47 from the hook 46. A keeper 56 having arms 57 is pivoted to the bridging strip 58 of the yoke 50 and when the keeper is turned to the operative position, shown in Figure 15, the arms 57 pass through openings or slots 59 formed in side walls of the body and prevent the yoke and the retainer from moving upwardly to a released position. A post or standard 60 which is rigid with the keeper extends upwardly therefrom and at its upper end is formed with hinge ears 61 with which side plates 62 of a handle 63 are pivotally connected by a pin 64. The side plates or leaves 62 extend outwardly and then downwardly from the post and an arm 65 extends downwardly from its lower edge in such position that the bills 66 at lower ends of the arms will pass through the openings 59 in engagement with side edge faces of the arms 57 and prevent the keeper from being accidentally turned to a releasing position. Helical springs 67 which are disposed between side faces of the post and the downwardly extending portions of the leaves or plates 62 urge the leaves outwardly and prevent the bills 66 from unintentionally slipping inwardly out of the openings. When the yoke and the retainer are to be released pressure must be applied in order to force the leaves inwardly toward each other and in order that this may be easily done there have been provided lugs 68 which project outwardly from the depending portions of the leaves in such position that when the handle 63 is grasped and pressure applied the leaves will be swung inwardly about the pin 64. The bills will thus be dislodged from the openings 57 and turning movement may then be applied to the handle 63 to turn the keeper about its securing pin 69 and the arms 57 will be moved out of the openings 59 and the yoke 50 and the retainer 48 may then move upwardly to the released position. Since pressure must be applied to both leaves in order to permit turning movement of the handle and the fastener there is no danger of the yoke and the retainer being prematurely released.

Having thus described the invention, what is claimed is:

1. A quick release device for a parachute harness comprising a block formed with a pocket open along its top and at one end and having side walls formed with longitudinally extending slots and a bottom formed with a transversely extending opening, ears extending downwardly from the bottom at opposite sides of the opening, a tongue extending downwardly from the block at the front side thereof opposite space between the ears, a hook pivotally mounted between said ears and having its bill extending towards the tongue and its shank extending upwardly through the opening in the bottom of the pocket when in an operative position, a stem projecting from the block at the closed end of the pocket for engagement by a shackle of a shoulder strap of a harness, plates formed with openings for receiving the bill of the hook and suspending the plates from the hook, said plates having stems at lower ends for engagement by shackles of leg straps of a harness, a retainer having one end pivotally mounted at the open end of the pocket and of a length adapting it to be swung to a horizontal position in the pocket, said retainer having a head at its free end resting upon the bottom of the pocket when the retainer is in the horizontal position, said retainer resting upon the upper end of the shank of the hook when horizontal and preventing tilting of the hook to a position releasing the plates and the head of the retainer having a recess formed across its upper portion, a yoke having a cross bar and side bars and a head connecting the side bars and provided with a stem for engagement by the shackle of a second shoulder strap of a harness strap, said yoke fitting into the pocket and extending longitudinally therein with its cross retainer engaged in the recess of the bar and its side bars extending along opposite sides of the retainer, a bridge extending between side bars of the yoke and across the upper face of said retainer, a keeper pivoted upon said bridge and having an upstanding handle and arms projecting from opposite sides for engaging in the slots of the side walls of the pocket to hold the keeper in place when turned to a securing position, a latch carried by said body and consisting of a resilient strip disposed vertically and having a lower end secured to the block and its upper end portion bent to form a bill overlapping the top of the block, a tooth carried by said resilient strip for passing through the slot of the front wall of the pocket and engaging an arm of the keeper to prevent turning of the keeper to a releasing position, and a lever pivoted in vertical position to the keeper with its upper portion in position to be engaged by a hand grasping the handle of the keeper and its lower end in position to engage the bill of the latch and move the latch away from the block to withdraw its tooth from the slot in the front wall of the pocket and allow turning of the keeper to a releasing position.

2. A quick release device for a parachute harness comprising a block formed with a pocket open along its top and at one end and having front and rear side walls and its bottom each formed with an opening, means for connecting a harness strap with the block at the closed end of the pocket, a hook pivotally mounted under the block for passing through openings in end members for leg straps of a harness, said hook having a shank passing upwardly through the opening in the bottom of the pocket when the hook is in an operative position, a bar extending longitudinally in the pocket and pivoted at its outer end for swinging movement from a reclining position in the pocket to a raised position and when in the reclining position resting upon the upper end of the shank to hold the hook in the operative position, a yoke extending longitudinally in the pocket about the retainer and having a cross bar at its inner end engaging across the inner end of the retainer and means at its outer end for connection with a harness strap, a bridge carried by the yoke, a keeper pivoted upon the bridge and having an upstanding handle and side arms for engaging through the openings in the front and rear walls of the pocket and extending across the yoke to hold the yoke and the retainer in place, a latch carried by the block and having a tooth entering the front slot for engaging the front arm of the keeper and preventing accidental turning of the keeper to a released position, and a member for moving the latch to a releasing position carried by the keeper and actuated by a hand grasping the handle.

3. A quick release for a parachute harness comprising a body formed with a pocket open at one end and having openings at front and rear side walls thereof and through its bottom, a hook under the body pivotally mounted and having a shank passing through the bottom opening when in an operative position, strap-engaging members having portions formed with openings through which the hook engages to releasably secure leg straps of a harness, a retainer pivotally mounted in the open end of the pocket for vertical swinging movement and when in a reclining position in the pocket engaging the shank to hold the hook in its operative position, means for connecting a harness strap with the body at the closed end of the pocket, a yoke extending longitudinally in the pocket through the open end thereof and engaged about the free end of the retainer, means for connecting the outer end of the retainer with a strap, a keeper pivoted to the yoke and having side arms and a handle for turning the keeper to an operative position disposing its arms through the openings in the front and rear walls of the pocket, a latch for securing the keeper in the operative position, and means for moving the latch to a releasing position carried by the keeper in position for operation by a hand grasping the handle.

4. A quick release for a parachute harness comprising a body formed with a pocket open at its top and formed with an opening in its bottom, means for connecting a harness strap with one end of the body, a hook pivoted under the body having a shank passing through the bottom opening when in an operative position, a retainer pivoted in the pocket for vertical movement and when reclining extending longitudinally in the pocket and across the shank of the hook to hold the hook in its operative position, a yoke extending longitudinally in the pocket and having means at its outer end for engagement with a harness strap, the inner end of the yoke engaging across the free end of the retainer, a keeper pivoted to the yoke and having interlocking engagement with a front and rear walls of the pocket when in an operative position to hold the yoke and the retainer against upward movement in the pocket, a latch for securing the keeper in its securing position, and means for moving the latch to a releasing position carried by the keeper.

5. A quick release for parachute harnesses comprising a body formed with a pocket open along its top and having an opening through its bottom, a hook for engaging leg straps of a harness movably mounted under the body and having a shank passing through the bottom opening when in an operative position, a retainer pivoted in the pocket for vertical movement and when in a reclining position engaging the upper end of the shank to hold the hook in its operative position, a yoke extending longitudinally in the pocket and having its outer end adapted for connection with a harness strap, the inner end of the yoke being engaged with the retainer and released therefrom when the retainer swings upwardly, a keeper carried by said yoke and movable into and out of securing engagement with the body, a latch for releasably securing the keeper in its securing position, and means for moving the latch to a releasing position adapted to be actuated by a hand grasping the keeper.

6. A quick release device for parachute harnesses comprising a body, means for connecting a harness strap with one end of the body, a hook pivoted to the body for engaging leg straps of a harness, a retainer pivoted to said body for vertical movement and when reclining engaging the hook to hold the hook in an operative position, a yoke extending longitudinally of the retainer and detachably engaged with the free end thereof and having its outer end adapted for connection with a harness strap, a keeper pivoted to the retainer for movement into and out of a securing position and extending across the yoke when in the securing position, a latch for securing the keeper in an operative position, and a member for moving the latch to a releasing position adapted to be moved to a releasing position by a hand grasping the keeper.

7. A quick release device for parachute harnesses comprising a body, means for connecting a harness strap with one end of the body, a hook pivoted to the body for engaging leg straps of a harness, a retainer carried by the body and movable into and out of position to secure the hook in an operative position, a yoke detachably engaged with the retainer and adapted for connection with a harness strap, and a keeper carried by said yoke and movable into and out of position to extend across the retainer and engage portions of the body to hold the retainer and the yoke in an operative position.

8. A quick release device for parachute harnesses comprising a body open along its top and at one end, means for connecting a harness strap with the other end of the body, a hook for engaging leg straps of a harness pivoted to the body, a retainer pivoted in the open end of the body for vertical swinging movement from a horizontal operative position in the body for engaging and securing the hook in an operative position to a raised position for releasing the hook, a yoke fitting about the retainer longitudinally thereof and having its outer end projecting through the open end of the body and provided with means for connecting a harness strap with the yoke, a keeper pivoted to the yoke for turning movement into and out of a position to extend across the keeper and the yoke and engage walls of the body, a handle forming an element of the keeper, and means for releasably securing said keeper in a set position in which the keeper is disposed in securing engagement with the walls of the body.

9. A quick release device for parachute harnesses comprising a body open along its top and at one end, means for connecting a harness strap with the other end of the body, a hook for engaging leg straps of a harness pivoted to the body, a retainer pivoted in the open end of the body for vertical swinging movement from a horizontal operative position in the body for engaging and securing the hook in an operative position to a raised position for releasing the hook, a yoke fitting about the retainer longitudinally thereof and having its outer end projecting through the open end of the body and provided with means for connecting a harness strap with the yoke, a keeper pivoted to the yoke for turning movement into and out of position to extend across the retainer and the yoke and engage through openings in front and rear walls of the body, a post extending upwardly from the keeper, and a handle carried by said post and having members for passing through the openings and engaging side faces of the keeper to hold the keeper in an operative position.

10. A quick release device for parachute harnesses comprising a body open along its top and at one end, means for connecting a harness strap with the other end of the body, a hook for engaging leg straps of a harness pivoted to the body, a retainer pivoted in the open end of the body for vertical swinging movement from a horizontal operative position in the body for engaging and securing the hook in an operative position to a raised position for releasing the hook, a yoke fitting about the retainer longitudinally thereof and having its outer end projecting through the open end of the body and provided with means for connecting a harness strap with the anchor, a keeper pivoted to the yoke for turning movement into and out of a position to extend across the retainer and the yoke and engage through openings in front and rear walls of the body, a post extending upwardly from the keeper, and a handle carried by said post and consisting of leaves pivoted to the post and extending from opposite sides thereof with portions extending downwardly and formed with bills for passing through the openings in the walls of the body and releasably holding the keeper in its operative position.

11. A quick release device for parachute harnesses comprising a body open along its top and at one end, means for connecting a harness strap with the other end of the body, a hook for engaging leg straps of a harness pivoted to the body, a retainer pivoted in the open end of the body for vertical swinging movement from a horizontal operative position in the body for engaging and securing the hook in an operative position to a raised position for releasing the hook, a yoke fitting about the retainer longitudinally thereof and having its outer end projecting through the open end of the body and provided with means for connecting a harness strap with the anchor, a keeper pivoted to the yoke for turning movement into and out of a position to entend across the reainer and the yoke and engage through openings in front and rear walls of the body, a post extending upwardly from the keeper, and a handle carried by said post and consisting of leaves pivoted to the post and extending from opposite sides thereof with portions extending downwardly and formed with depending arms terminating in bills for passing through the openings in the walls of the body and securing the keeper in its operative position, and springs between the post and depending portions of the leaves and urging the leaves away from the post.

12. A quick release device for parachute harnesses comprising a body open along its top and at one end, means for connecting a harness strap with the other end of the body, a hook for engaging leg straps of a harness pivoted to the body, a retainer pivoted in the open end of the body for vertical swinging movement from a horizontal operative position in the body for engaging and securing the hook in an operative position to a raised position for releasing the hook, a yoke fitting about the retainer longitudinally thereof and having its outer end projecting through the open end of the body and provided with means for connecting a harness strap with the yoke, a keeper pivoted to the yoke for turning movement into and out of a position to extend across the retainer and the yoke and engage through openings in front and rear walls of the body, a post extending upwardly from the keeper, and a handle carried by said post and consisting of leaves pivoted to the post and extending from opposite sides thereof with portions extending downwardly and formed with depending arms terminating in bills for passing through the openings in the walls of the body and securing the keeper in its operative position, springs between the post and depending portions of the leaves and urging the leaves away from the post and holding the bill in the openings, and lugs projecting outwardly from the leaves for swinging the leaves toward each other to a releasing position when the handle is grasped to turn it and move the keeper out of the openings to a releasing position.

JAMES W. HORNING.

No references cited